Feb. 2, 1932.  W. BUSSMANN  1,843,119
ROTARY TILLER
Filed Feb. 27, 1930   3 Sheets-Sheet 1
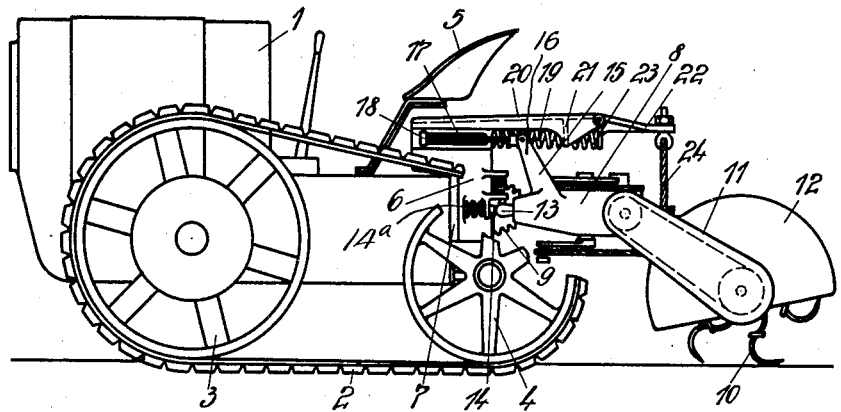
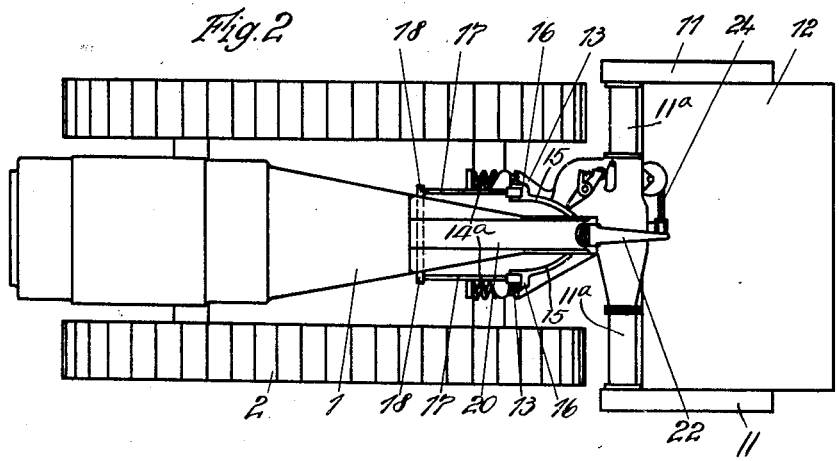

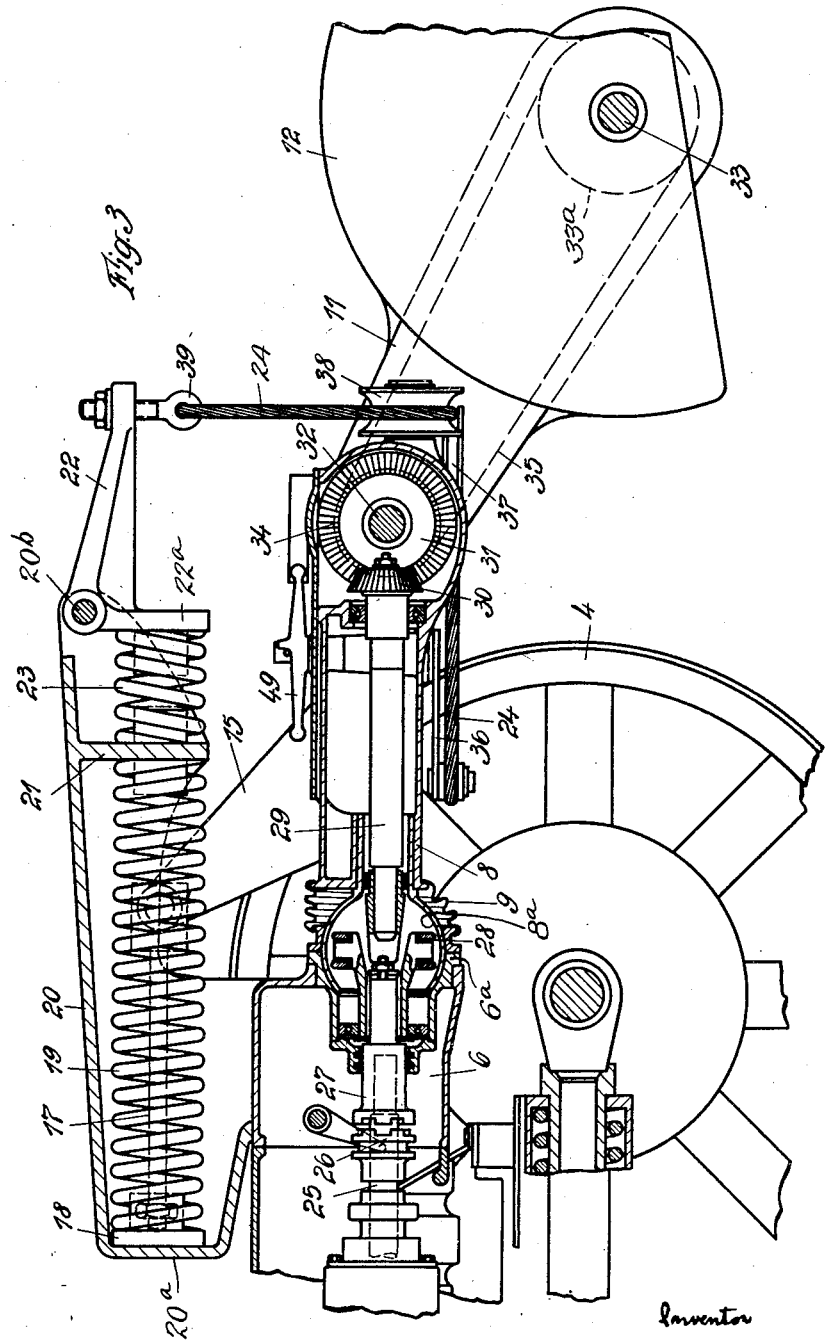

Feb. 2, 1932. W. BUSSMANN 1,843,119
ROTARY TILLER
Filed Feb. 27, 1930 3 Sheets-Sheet 3
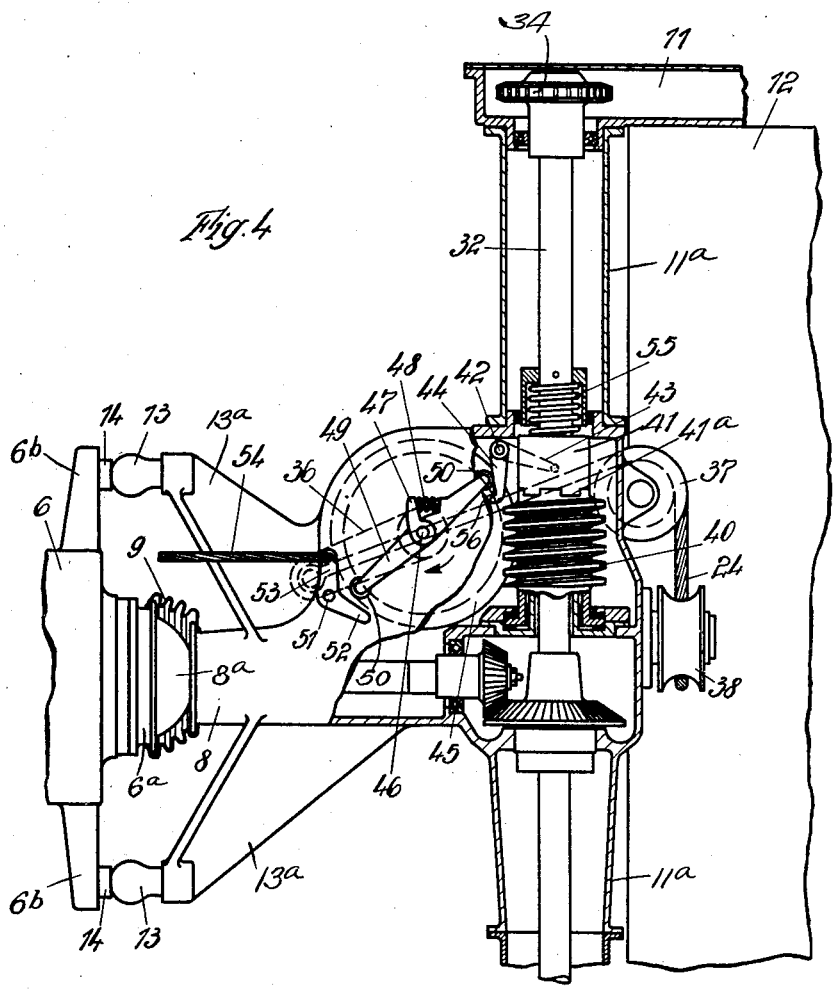
Inventor
Wilhelm Bussmann
by Knight Bro
attorney Patented Feb. 2, 1932

1,843,119

UNITED STATES PATENT OFFICE

WILHELM BUSSMANN, OF BERLIN, GERMANY, ASSIGNOR TO SIEMENS-SCHUCKERT-WERKE AKTIENGESELLSCHAFT, OF BERLIN-SIEMENSSTADT, GERMANY, A CORPORATION OF GERMANY

ROTARY TILLER

Application filed February 27, 1930, Serial No. 431,784, and in Germany March 2, 1929.

My invention relates to rotary tillers in which a motor-driven cultivator may be raised and lowered in relation to the truck to which it is connected and more especially contemplates a rotary cultivator in the form of an attachment for traction engines of standard or well known type.

The object of my invention is to provide an improved construction and arrangement of parts in a machine of this character whereby the operations of the machine may be facilitated and brought under the control of an operator by an improved manual control of power driven mechanism. Specific features of construction and their operating connection will be described in the specification and recited in the appended claims, reference being had to the accompanying drawings which exemplify my invention in a preferred embodiment.

In the drawings:

Figure 1 is a side elevation of a traction engine to which a rotary tiller having my improved construction has been attached;

Figure 2 is a top plan view of the same;

Figure 3 is an enlarged vertical longitudinal section of the cultivator attachment, parts being broken away and parts shown in side elevation;

Figure 4 is a top plan view of said cultivator attachment according to Figure 3 with the overhanging suspension means removed.

Like numerals of reference indicate like parts throughout the figures of the drawings.

As shown in Figures 1 and 2 of the drawings, the traction engine comprises an engine housing 1, caterpillar tractors 2 operating around front and back tractor wheels 3 and 4 and a driver's seat 5 suitably arranged for controlling the vehicle.

According to the preferred embodiment of my invention shown on the drawings, my improved cultivator is constructed in the form of a trailer suitable for attachment to a tractor of usual construction. For this purpose, an attachment member in the form of a housing extension 6 may be rigidly secured at 7 to the rear end of engine housing 1. Extending rearwardly from the housing extension 6 and movably connected thereto, is a movable member which is preferably in the form of a power shaft housing 8 which, as shown in Figure 3 of the drawings, is provided with a part-spherical bearing member 8a which has a limited universal movement within a part-spherical bearing socket 6a, carried by the housing extension 6. A housing 9 for the ball and socket joint 8a, 6a, may be rendered flexible by providing it with accordion pleated walls for permitting upward and downward as well as lateral movements of a power-transmission shaft to be hereinafter referred to. As shown in Figure 1 a rotary tiller 10 is mounted under a part-cylindrical hood or cover 12 which, as shown in Figure 2 is supported at opposite ends between laterally spaced hollow arms or housings 11. Said arms or housings 11 are preferably rigidly connected to the outer ends of tubular shaft housings 11a which project outwardly from opposite sides of an irregular enlargement of the power shaft housing 8 as seen best in Figure 4. Inclined forwardly and laterally with respect to the power shaft housing 8 as shown in Figure 4, are bracket arms 13a which carry rounded knobs 13, said knobs being arranged to bear against yieldably mounted abutments 14 which are movable axially in laterally-presented arms 6a, carried by the housing extension 6 and cushioned by compression springs 14a as shown in Figures 1 and 2. This device serves to resiliently limit the lateral movements of the trailer while at the same time absorbing the shocks to which it is subjected. Inclined upwardly and forwardly from the power-shaft housing 8 as shown in Figures 1 and 2, are laterally branching bracket arms 15 which are provided with bifurcated ends 16 for the reception of the rear ends of a pair of connection rods 17, said connection rods being connected at their forward ends by a transverse bar 18. Mounted upon the housing extension 6 and rigidly attached thereto, is a rearwardly overhanging frame 20 which as shown best in Figure 3, is provided with a transverse web 21. Interposed between the transverse web 21 and the transverse bar 18 which bears against a vertical portion 20a of the overhanging frame, is a compression spring 19 which partially supports and cushions the vertical movements of the power-shaft housing 8. The forward end of frame 20 carries a transverse pin 20b upon which is pivoted a bell-crank lever comprising a substantially horizontal arm 22 and a depending arm 22a. Interposed between the depending arm 22a of said bell-crank lever and the transverse web 21 of the frame 20, is a cushioning spring 23. As shown in Figure 3, a power-driven shaft section 25 may be connected by a clutch member 26 slidable axially thereon, to a rigid clutch member 27 on an intermediate shaft section which is connected by a universal coupling 28 to a drive shaft 29. Keyed to the rear end of drive shaft 29, is a bevel pinion 30 which meshes with a bevel gear 31 on a transverse power shaft 32. According to the present embodiment of my invention, the power shaft is arranged parallel to and made of substantially the same length as a driven shaft 33 which is journaled in suitable bearings (not shown) in the rear lower ends of the arms or housings 11 and carries the rotary tiller 10. As shown in Figures 3 and 4 the power shaft carries sprocket wheels 34 at its opposite ends, said sprocket wheels being connected by sprocket chains 35 to sprocket wheels 33a on the rotary tiller shaft 33.

Power-driven means for raising and lowering the rotary tiller with its connections may be provided as follows. Revolvable in a horizontal plane below the power-shaft housing 8, is a crank-arm 36. Attached to the outer end of said crank-arm is a rope or cable 24 which extends around a horizontal pulley 37 to and around a vertical pulley 38 and attached at its other end to an eye-bolt 39 which depends from the horizontal arm 22 of the bell-crank lever above mentioned. It will be understood from this description that a revolving movement of the crank-arm 36 may produce a successive taking up and letting out of the cable 24 in such a way as to raise and lower the cultivator trailer about a horizontal axis through the center of ball and socket joint 8a, 6a, said axis of movement also including the bearing contacts between the knobs 13 and cushioned abutments 14. Loosely journalled upon the power-shaft 32, is a worm 40 which is provided with a clutch-end adapted to be releasably engaged by the clutch-end 41a of a clutch-member 41 which is splined to the shaft 32 and movable axially thereon by a clutch-shift arm 43 carried by an oscillatable shaft 42. A second arm 44 secured to the shaft 42 is adapted to be actuated in the manner to be hereinafter pointed out for moving the clutch member 41 into clutch with the worm 40, said worm being thereby adapted to deliver power to a worm gear 45 which is keyed to a vertical spindle 46. The trailer-elevating crank-arm is keyed to the lower end of spindle 46 so that whenever the worm 40 is clutched to the power-shaft 32, the crank-arm 36 is caused to revolve about the vertical axis of spindle 46. Secured to the upper end of spindle 46 is a radial arm 47 which operates yieldably through a compression spring 48 upon a double-ended lever 49 which is freely journaled upon the spindle 46. In the outer end of each arm of the lever 49, is journaled a cam-roller 50 which operates upon the clutch-operating cam-arm 44. Pivotally mounted upon a pin 51 which projects upwardly from the power-shaft housing 8, is a bell-crank lever comprising an arm 52 adapted to impart an initial movement to the lever 49 and an arm 53 to which is connected a rope or cable 54 leading from the operator's seat. A spring 55 tends to hold the clutch 41 in power-transmitting position, this power connection being released however by the continued movement of the cam-roller 50 along the cam-arm 44 until said cam-roller comes to rest in a recess 56 with the clutch disengaged, the rotary cultivator being in raised position when the arm 36 is in its forward position as shown in Figure 4 or in lowered position when said arm 36 is presented rearwardly in a direction opposite to that shown in Figure 4. It will be understood from this description that after each counter-clockwise actuation of the bell crank 52, 53, the worm 40 is clutched to the shaft 52 and drives the worm gear 45 through one-half a complete rotation during which the trailer cultivator is raised or lowered to a new position in which it remains until the next actuation of said bell crank lever.

It will be understood that various modifications may be made in the constructions and arrangements of parts described above and shown on the drawings, within the purview of my invention as recited in the following claims.

I claim:

1. In an attachment for traction engines, an attachment member for attachment to a traction engine, a casing pivotally connected to said attachment member, a shaft journaled in said casing, cultivating tools mounted on said shaft, power connections for driving said shaft from the power plant of said traction engine, hoisting mechanism interconnected between said casing and attachment member for raising and lowering said casing, said hoisting mechanism including a revolvable crank mounted on said casing, a hoisting cable extending between said casing and attachment member and connected to said crank, means for releasably connecting said revolvable crank to said power connections, and means for controlling said releasable crank-connections at will for imparting successive 180° angular movements to said crank.

2. In combination with a traction engine, an attachment including a member movable in relation to said traction engine, a shaft carried by said movable member and provided with an earth-cultivating tool, power connections for operating said shaft by the power plant of said traction engine, a cushion frame rigidly mounted upon said traction engine, said frame being provided with an abutment web, a spring interposed between said web and a rigid part carried by said movable member, said spring being adapted to carry part of the weight of said movable member, a shock-absorber arm connected to said movable member, and a second spring interposed between said shock-absorber arm and said web.

3. An attachment for traction engines for tilling the ground, said attachment comprising a member adapted to be connected to a traction engine, a movable member pivotally connected to the first-mentioned member, a shaft journaled in said movable member and provided with tools for cultivating the ground, means for connecting said shaft to the power transmission of said traction engine, a device interoperating between the movable member and the first-mentioned member for raising and lowering said movable member, means for driving said device from said shaft, said device for raising and lowering the movable member being provided with a crank revolvable by said shaft.

4. An attachment for traction engines comprising an attachment member adapted to be secured to a traction engine, a movable member pivotally connected to said attachment member, means for cushioning relative vertical movements of said movable member with respect to said attachment member, a cultivator mounted on said movable member, power-drive connections for said cultivator, hoisting mechanism connecting the movable member and said attachment member for raising and lowering said cultivator, and means for driving said hoisting mechanism including a releasable connection with said power-drive connections for the cultivator.

5. An attachment for traction engines comprising an attachment member adapted to be secured to a traction engine, a movable member pivotally connected to said attachment member, cushioning means interoperating between said attachment and movable members, a cultivator mounted on said movable member, driving connections for said cultivator hoisting mechanism connecting said movable member and said attachment member for raising and lowering said cultivator, a releasable clutch for connecting said hoisting mechanism to said driving connections, and manually controlled means for operating said clutch.

6. An attachment for traction engines comprising an attachment member adapted to be secured to a traction engine, a movable member pivotally connected to said attachment member, a cultivator mounted on said movable member, driving connections for said cultivator, hoisting mechanism connecting the movable member and said attachment member for raising and lowering said cultivator, and means for driving said hoisting mechanism including a revolvable crank arm, and a releasable coupling between said revolvable crank arm and the driving connections for said cultivator.

7. An attachment for traction engines comprising a housing extension adapted to be secured to a traction engine, a power-shaft housing universally connected to said housing extension, laterally-spaced yieldable buffers interposed between said housing extension and said power-shaft housing, other cushioning means interposed between rigid portions of said housing extension and power-shaft housing for absorbing shocks in a vertical plane, a cultivator mounted on said power-shaft housing, driving connections for said cultivator, extending through said housing extension and power-shaft housing, hoisting mechanism connecting said power-shaft housing to said housing extension for raising and lowering said cultivator, and means for driving said hoisting mechanism including a releasable connection between the first-mentioned driving connections and said hoisting mechanism.

8. An attachment for tractors, said attachment comprising an extension adapted to be secured to the frame of a tractor, an overhanging frame carried by said extension, a power-shaft section journaled in said extension, a power-shaft housing articulately connected to said extension, a bell crank lever pivotally mounted in said overhanging frame, said bell crank lever comprising a rearwardly presented substantially horizontal arm and a depending arm, a second power shaft section journaled in said power shaft housing, said second power shaft section being articulately connected to the first-mentioned power-shaft section, a compression spring interposed between said depending arm of the bell-crank lever and a rigid portion of said overhanging frame, hoisting mechanism for raising and lowering said power-shaft housing, said hoisting mechanism including a crank-arm revolvable about an axis, a cable secured at opposite ends to said rearwardly-presented substantially horizontal arm of the bell-crank lever and said revolvable crank-arm, a releasable power connection between said revolvable crank-arm and said second power-shaft section, and manually operated means for controlling said releasable power connection, and a cultivator carried by said power-shaft housing.

9. An attachment for tractors, said attachment comprising a housing extension adapted to be rigidly attached to the engine housing of a tractor, an overhanging frame carried by said housing extension, a power-shaft section journaled in said housing extension, a movable housing articulately connected to said housing extension, a cultivator carried by said movable housing, a bell-crank lever pivotally mounted in said overhanging frame, said bell-crank lever comprising a rearwardly-presented arm and a depending arm, means interposed between said depending arm of the bell-crank lever and said overhanging frame for cushioning the movements of said bell-crank lever, a rotary shaft journaled in said movable housing, power-connections between said rotary shaft and said power-shaft section, said power connections being adapted to permit upward and downward movements of said movable housing, a worm freely journaled on said rotary shaft, a clutch for releasably connecting said worm to said rotary shaft, a worm gear in mesh with said worm, a worm gear shaft journaled in said power-shaft housing, a double-ended lever keyed to said worm gear shaft, a clutch-shift lever arranged to be actuated by opposite ends of said double-ended lever successively for moving said clutch to release position, a hand-operated bell-crank lever for imparting an initial movement to said double-ended lever for releasing said clutch-shift lever for permitting said clutch to move into clutch with said worm, a crank-arm keyed to said worm-gear shaft, and a hoisting cable for said movable housing, one end of said hoisting cable being connected to the rearwardly-presented arm of the first-mentioned bell-crank lever and the other end of said hoisting cable being connected to said crank-arm on the worm gear shaft.

10. In a device of the character described, the combination with a housing extension adapted to be rigidly attached to the engine housing of a tractor, of an overhanging frame carried by said housing extension, a movable housing articulately connected to said housing extension, a rotary cultivator mounted on said movable housing, hoisting mechanism connected to said overhanging frame for raising and lowering said movable housing, power-connections extending through said housing extension and movable housing for driving said rotary cultivator, a releasable connection between said hoisting mechanism and said power-connections, manually controlled means for operating said releasable connection, laterally-spaced buffers for cushioning the lateral swing of said moveable housing with respect to said housing extension, and cushioning means mounted in said overhanging frame and connected to said movable housing for absorbing the shocks between the movable housing and said housing extension due to relative vertical movements there-between.

11. In a device of the character described, the combination with a housing extension adapted to be rigidly attached to the engine housing of a tractor, of an overhanging frame carried by said housing extension, a movable housing articulately connected to said housing extension, a rotary cultivator mounted on said movable housing, hoisting mechanism connected to said overhanging frame for raising and lowering said movable housing, power-connections extending through said housing extension and movable housing for driving said rotary cultivator, a releasable connection between said hoisting mechanism and said power connections, manually controlled means for operating said releasable connection, laterally-spaced buffers for cushioning the lateral swing of said movable housing with respect to said housing extension, and cushioning means mounted in said overhanging frame and connected to said movable housing for absorbing the shocks between the movable housing and said housing extension due to relative vertical movements therebetween, the last-mentioned cushioning means comprising laterally-spaced rods connected at one end by a transverse bar, and a compression spring interposed between said transverse bar and a rigid portion of the overhanging frame, said movable housing being provided with upwardly presented arms pivotally connected to the other ends of said laterally-spaced rods.

12. In a device of the character described, the combination with an extension adapted to be rigidly attached to a rigid portion of a tractor, of an overhanging frame carried by said extension, said overhanging frame being provided with a transverse web, a power-shaft section journaled in said extension, a housing universally coupled to said extension, a second power-shaft section journaled in said housing, said power-shaft sections being universally connected together, a bell-crank lever pivotally mounted in said overhanging frame above said housing, one arm of said bell crank being presented rearwardly and horizontally therefrom, mechanism for movably suspending the rear end of said housing from said rearwardly-presented arm of the bell-crank lever, a compression spring interposed between the other arm of said bell-crank lever and the transverse web of said overhanging frame, a rotary cultivator carried by said housing, said housing being provided with upwardly-presented laterally-spaced arms, laterally-spaced rods connected to the upper ends of said arms, a cross-bar connected to the other ends of said rods, a compression spring interposed between said cross-bar and said web of the overhanging frame, and operating connections between the second-mentioned power-shaft section and said rotary cultivator.

13. In a device of the character described, the combination with an extension adapted to be rigidly attached to a rigid portion of a tractor, of an overhanging frame carried by said extension, said overhanging frame being provided with a transverse web, a power-shaft section journaled in said extension, a housing universally coupled to said extension, a second power-shaft section journaled in said housing, said power-shaft sections being universally connected together, a bell-crank lever pivotally mounted in said overhanging frame above said housing, one arm of said bell-crank being presented rearwardly and horizontally therefrom, hoisting mechanism for movably suspending the rear end of said housing from said rearwardly-presented arm of the bell-crank lever, a compression spring interposed between the other arm of said bell-crank lever and the transverse web of said overhanging frame, a rotary cultivator carried by said housing, said housing being provided with upwardly-presented laterally-spaced arms, laterally-spaced rods connected to the upper ends of said arms, a cross-bar connected to the other ends of said rods, a compression spring interposed between said cross-bar and said web of the overhanging frame, and operating connections between the second-mentioned power-shaft section and said rotary cultivator, said hoisting mechanism being provided with a revolvable arm releasably connected to the operating connections for said rotary cultivator, and manually controlled means for operating said releasable connection.

In testimony whereof I affix my signature.

WILHELM BUSSMANN.